United States Patent [19]

Kashiwase et al.

[11] Patent Number: 5,273,492
[45] Date of Patent: Dec. 28, 1993

[54] HYDRAULIC CONTROL SYSTEM FOR A CONTINUOUSLY VARIABLE TRANSMISSION WITH A TORQUE CONVERTER

[75] Inventors: Hajime Kashiwase; Keiji Sato, both of Tokyo, Japan

[73] Assignee: Fuji Jukogyo Kabushiki Kaisha, Tokyo, Japan

[21] Appl. No.: 886,066

[22] Filed: May 20, 1992

[30] Foreign Application Priority Data

May 31, 1991 [JP] Japan .................. 3-174291

[51] Int. Cl.$^5$ .................. F16H 55/56; F16H 57/04
[52] U.S. Cl. .................. 474/43; 74/467; 474/28
[58] Field of Search .................. 74/467, 867, 890; 474/28, 43

[56] References Cited

U.S. PATENT DOCUMENTS

| | | | |
|---|---|---|---|
| 4,466,312 | 8/1984 | Oguma | 74/867 X |
| 4,543,077 | 9/1985 | Yamamuro et al. | 474/28 X |
| 4,669,336 | 6/1987 | Okada et al. | 474/28 X |
| 4,718,308 | 1/1988 | Haley | 74/867 X |
| 4,846,765 | 6/1989 | Sakai | 474/28 |
| 4,967,621 | 11/1990 | Soga et al. | 74/867 |
| 5,012,696 | 5/1991 | Miyawaki | 74/867 X |

FOREIGN PATENT DOCUMENTS 62-137462  6/1988  Japan .

*Primary Examiner*—Leslie A. Braun
*Assistant Examiner*—David E. Henn
*Attorney, Agent, or Firm*—Martin A. Farber

[57] ABSTRACT

A high pressure circuit is connected between a secondary pressure control valve and a lockup clutch control valve for actuating a lockup clutch of a torque converter. A low pressure circuit is connected between the lockup clutch control valve and a continuously variable transmission. A high relief valve is provided in the high pressure circuit for controlling the lockup clutch with high pressure. A low relief valve is provided in the low pressure circuit for lubricating a transmission belt so as to improve cooling efficiency.

3 Claims, 5 Drawing Sheets

HYDRAULIC CONTROL SYSTEM FOR A CONTINUOUSLY VARIABLE TRANSMISSION WITH A TORQUE CONVERTER

BACKGROUND OF THE INVENTION

The present invention relates to a hydraulic control system for a continuously variable transmission provided with a torque converter having a lockup clutch, and more particularly to a circuit for supplying oil to an oil cooler and lubricating oil to various parts of the transmission system.

A known control system for a continuously variable belt-drive transmission comprises an endless belt running over a primary pulley and a secondary pulley. Each pulley comprises a movable conical disc which is axially moved by the fluid operated servo device so as to vary a running diameter of the belt on the pulleys in dependency on driving conditions. The system is provided with a hydraulic circuit including a pump for supplying oil to the servo devices, a secondary pressure control valve and a primary pressure control valve. Each valve comprises a spool which controls the oil supplied to the servo devices.

In the hydraulic circuit, a large quantity of oil is necessary to be applied not only to the transmission but also to the torque converter, a lockup clutch is provided for the torque converter, a selector device selects the forward driving and reverse driving, and lubricates the parts such as the belt of the transmission. The hydraulic circuit is adapted to supply an adequate quantity of the oil to each part while maintaining an oil balance in the circuit. Oil temperature is increased in the torque converter. In order to reduce the oil temperature, the oil cooler is disposed in a drain passage of the torque converter. It is necessary to supply a sufficient quantity of the oil to the oil cooler to maintain sufficient cooling efficiency although the passage of the oil changes to another passage in accordance with the operation of the lockup clutch. Furthermore, the belt must be lubricated without affecting the overall oil balance.

Japanese Patent Application Laid Open 62-137462 discloses a hydraulic circuit wherein the oil cooler is provided in a bypass passage from a regulator valve. The oil drained from the regulator valve is supplied to the lockup clutch, the torque converter and the selector device. Oil pressure applied to the devices are controlled to maintain an appropriate value.

The lubricating oil for the transmission is splashed on, or applied from the drain of the oil cooler to various parts of the transmission system. However, in order to splash up the oil, the oil is agitated, which causes a load on the transmission. Consequently the transmission efficiency is decreased and the quantity of the oil used is increased. As a result, fuel consumption and performance of the engine deteriorate. In another way, when the drain oil from the cooler is used, orifices and other devices are necessary to branch lubricating passages and to control the flow of the oil. The orifices cause increased resistance of the passage so that the oil is not sufficiently cooled. Moreover, the inner pressure of the oil cooler increases when the oil temperature is low, resulting in the cooler breaking down. If all the drain oil is used as the lubricating oil, the same defects as those caused by splashing occur.

SUMMARY OF THE INVENTION

An object of the present invention is to provide a hydraulic control system wherein sufficient quantity of oil is applied to an oil cooler regardless of an operational mode of a lockup clutch, and wherein an adequate quantity of lubricating oil is applied to each part without affecting an overall oil balance.

The other objects and features of this invention will become understood from the following description with reference to the accompanying drawings.

DETAILED DESCRIPTION OF THE PREFERRED EMBODIMENTS

Figure 1:
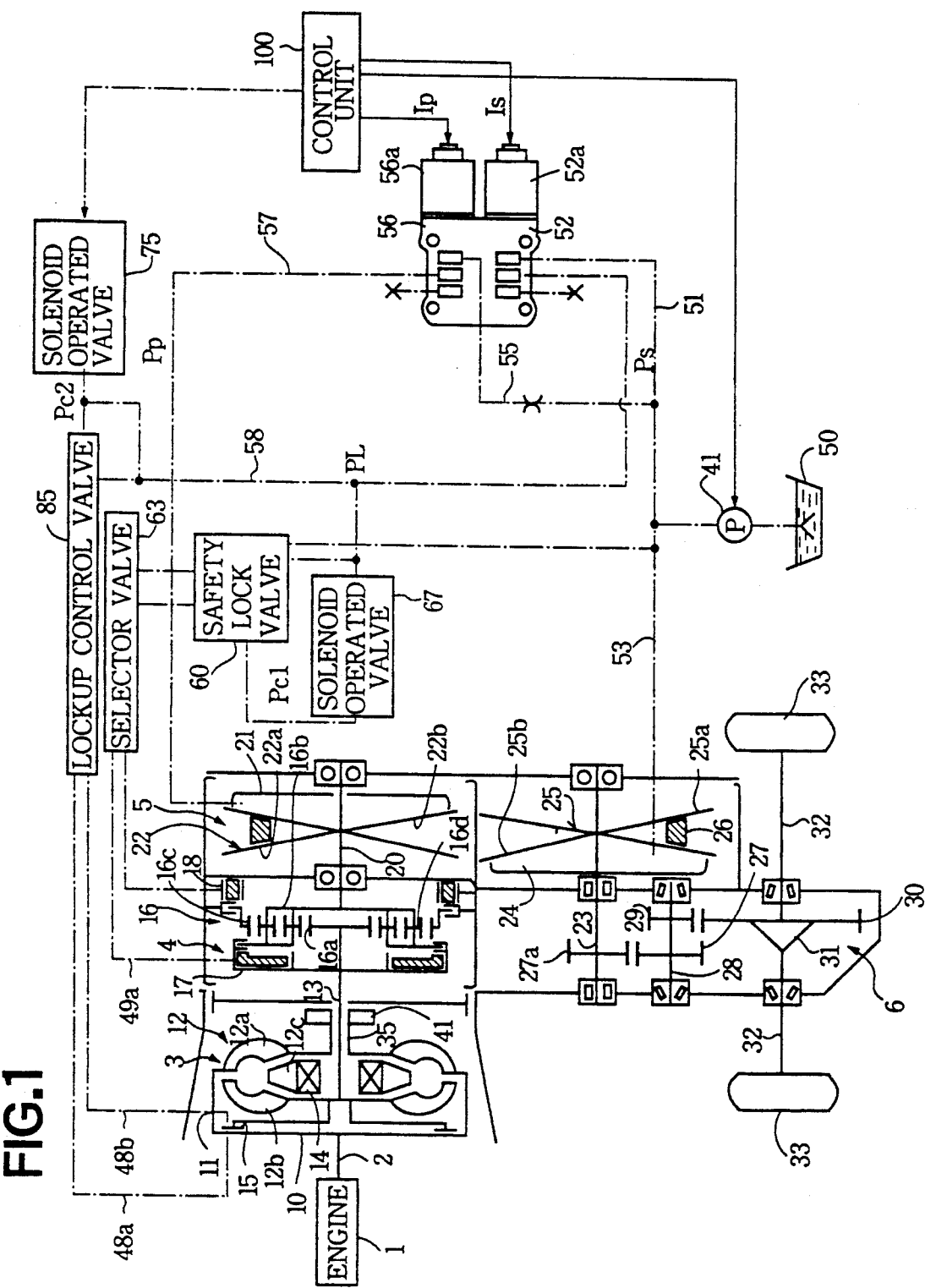
FIG. 1 shows a schematic diagram of a continuously variable belt-drive transmission to which the present invention is applied.

FIG. 1 shows a two-wheel drive power transmission system with a continuously variable belt-drive automatic transmission for a motor vehicle, to which the present invention is applied. An engine 1 is mounted on the motor vehicle at a front portion thereof. The power transmission system comprises a torque converter device 3, a selector device 4, a continuously variable belt-drive transmission 5, and a final reduction and differential device 6.

The torque converter device 3 has a torque converter 12 with a lockup clutch 15. A drive plate 10 is fixed to a crankshaft 2 of the engine 1. A converter cover 11 is secured to the drive plate 10. The torque converter 12 comprises an impeller 12a welded to the converter cover 11, a turbine 12b connected to an input shaft 13, and a stator 12c connected to a one-way clutch 14. The lockup clutch 15 is disposed between the converter cover 11 and the torque converter 12 for making contact with the cover 11.

The selector device 4 comprises a planetary gear 16 having a pair of pinions 16d, and a sun gear 16a mounted on the input shaft 13. The pinions 16d are supported on a carrier 16b. The sun gear 16a is engaged with a ring gear 16c through the pinions 16d. A forward clutch 17 is disposed between the sun gear 16a and the ring gear 16c. A reverse brake 18 is disposed between the ring gear 16c and a main case. During forward driving such as with a drive range (D) selection, the forward clutch 17 is engaged to lock the sun gear 16a with the pinion 16d. At reverse driving, the reverse brake 18 is engaged to lock the ring gear 16c for rotating the carrier 16b in reverse.

The belt-drive transmission 5 has a main shaft 20 engaged with the carrier 16 and an output shaft 23 provided in parallel with the main shaft 20. A primary pulley 22 and a secondary pulley 25 are mounted on the main shaft 20 and the output shaft 23, respectively. A fixed conical disc 22a of the primary pulley 22 is secured to the main shaft 20 and an axially movable conical disc 22b is axially slidably mounted on the main shaft 20. The movable conical disc 22b also slides in a primary cylinder 21 formed on the main shaft 20 to provide a servo device.

A fixed conical disc 25a of a secondary pulley 25 is formed on the output shaft 23 opposite the movable conical disc 22b and a movable conical disc 25b is slidably mounted on the shaft 23 opposite the disc 22a. The movable conical disc 25b has a cylindrical portion which is slidably engaged in a secondary cylinder 24 of the output shaft 23 to form a servo device. A drive belt 26 engages with the primary pulley 22 and the secondary pulley 25. The cylinder 21 of the drive pulley 22 is so designed that the pressure receiving area thereof is larger than that of the cylinder 24 of the secondary pulley 25. Thus, the effective diameter of the pulleys 22, 25, that is the running diameter of the belt 26 on the pulleys 22, 25, varies with driving conditions.

A drive gear 27a of the final reduction device 6 is secured to the output shaft 23 and engages with an intermediate reduction gear 27 on an intermediate shaft 28. An intermediate gear 29 on the shaft 28 engages with a final reduction gear 30. The rotation of the final reduction gear 30 is transmitted to axles 32 of driving wheels 33 of the vehicle through a differential 31.

Adjacent the torque converter 12, an oil pump device 41 is provided for supplying highly pressurized oil for the transmission. An oil pump drive shaft 35 is connected to the impeller 12a and is operatively connected with the converter cover 11.

Oil in an reservoir 50 is supplied to a secondary pressure control valve 52 (line pressure control valve) through a passage 51 by the pump 41 for producing a predetermined secondary pressure Ps. An oil passage 53 connected to the passage 51 is communicated with the cylinder 24 of the secondary pulley 25, so that the secondary pressure Ps is applied to the secondary cylinder 24. The passage 51 is further communicated with a primary pressure control valve 56 (transmission ratio control valve) through a passage 55 so that the secondary pressure Ps is applied to the primary pressure control valve 56. The primary cylinder 21 of the primary pulley 22 is applied with a primary pressure Pp through the primary pressure control valve 56 and a passage 57. Thus, there are provided a primary system comprising the passages 55, 57 and the primary pressure control valve 56, and a secondary system comprising the passages 51, 53 and the secondary pressure control valve 52.

The secondary pressure control valve 52 is a type of a proportional solenoid operated relief valve having a proportional solenoid 52a. The primary pressure Pp is generated by reducing the secondary pressure Ps as described hereinafter.

The proportional solenoid 52a is adapted to be operated by a solenoid current Is supplied from a control unit 100. The current Is produces an electromagnetic force which biases a spool of the secondary pressure control valve 52. The secondary pressure Ps is automatically set to a value at which the secondary pressure balances with the sum of the electromagnetic force and spring force applied to the spool. Namely, the secondary pressure is controlled by the current Is.

The primary pressure control valve 56 is a type of a proportional solenoid operated reducing valve having a proportional solenoid 56a.

The proportional solenoid 56a is also operated by solenoid current Ip from the control unit 100. The current Ip produces an electromagnetic force which controls the primary pressure Pp in the same manner as the secondary pressure control valve 52.

A comparatively high first lubricating pressure PL is produced in a drain passage 58 of the secondary pressure control valve 52. The lubricating pressure is applied to the torque converter 12, the selector device 4 through a selector valve 63 and a safety lock valve 60. The lockup clutch control valve 85 and the safety lockup valve 60 are operated by solenoid operated valves 75 and 67, respectively, which are controlled by the control unit 100.

The hydraulic control circuit will be described in detail with reference to FIG. 2. The oil pump device 41 is a variable displacement pump of a roller vane type having a plurality of inlet and outlet ports. The pump device 41 comprises a main pump 42 and an auxiliary pump 43 both of which are operatively connected to a rotor 41b having vanes 41a. The main pump 42 has a pair of inlet port 42a and outlet port 42b, and the auxiliary pump 43 has a pair of inlet port 43a and outlet port 43b. The oil in the oil reservoir 50 is supplied to the inlet ports 42a and 43a through an inlet passage 36. The oil is continuously supplied to the secondary pressure control valve 52 through the outlet port 42b of the main pump 42 and the passage 51. The outlet port 43b of the auxiliary pump 43 is communicated with a changeover valve 44 through a passage 37 for selectively communicating the outlet port 43b with the inlet passage 36 or with the passage 51. The changeover valve 44 is operated by a solenoid operated on-off valve 46 to which a signal from the control unit 100 is applied. The solenoid operated valve 46 is a normally closed three-way valve having an inlet port connected to the passage 58, an outlet port communicated with an end chamber of the changeover valve 44, and a drain port. The lubricating pressure PL from the secondary pressure control valve 52 is applied to the inlet port of the valve 46.

The control unit 100 compares the discharge of the oil pump device 41 with the actually used oil quantity. When the control unit 100 determines that the quantity of oil used in the hydraulic circuit is larger than the quantity of oil discharged from the pump device 41, which occurs during acceleration in a low engine speed range, the solenoid operated valve 46 is turned on, thereby communicating the passage 58 with the passage 38. Thus an actuating pressure Pc3 is fed to the end chamber of the changeover valve 44 so that a spool of the valve 44 is urged to the right as shown in FIG. 2 by the pressure Pc3, thereby communicating the passage 37 with the passage 51. Thus the oil pump device 41 is operated in a twin mode to supply the oil to the secondary pressure control valve 52 through both of the pumps 42 and 43. On the other hand, when the quantity of the oil discharged from the pump device 41 increases thereby exceeding the quantity of the oil used during a stable state in a high engine speed range, the solenoid of the valve 46 is de-energized. The changeover valve 44 is hence operated to communicate the passage 37 with the passage 36 to return the oil to the auxiliary pump 43. The auxiliary pump 43 idles so that the pump device 41 is driven in a single mode where only the main pump 42 is driven to feed the oil to the secondary pressure control valve 52. Thus the oil pump device 41 is efficiently driven to supply an adequate quantity of the oil at a light load.

The passage 58 from the secondary pressure control valve 52 is communicated with a first (high) relief valve 59 for regulating the lubricating pressure PL at a predetermined pressure. The drain passage of the first relief valve 59 is communicated with a second (low) relief valve 80 for producing a second lubricating pressure PL′ which is lower than the first lubricating pressure PL. The second lubricating pressure PL′ is applied to various parts of the transmission system which need to be lubricated. For example, the lubricating pressure PL′ is applied to a nozzle 83 provided in the belt-drive transmission 5 through a passage 79a, having an orifice 82 for regulating the pressure, so as to lubricate the belt 26. A drain passage 81 of the second relief valve 80 is communicated with the inlet passage 36 of the oil pump device 41.

The lockup control value 85 is applied with the first lubricating pressure PL through passages 58 and 84 and with the second lubricating pressure PL′ through a passage 79. The lockup control valve 85 is communicated with an apply side chamber 15b of the lockup clutch 15 through a passage 87 having a relief valve 88 and a release side oil chamber 15a of the lockup clutch 15 through a passage 86. A drain passage 89 of the lockup control valve 85 is communicated with the oil reservoir 50 through an oil cooler 90. The lubricating pressure PL is also supplied to a solenoid operated on-off valve 75. When the solenoid operated valve 75 is turned off, the lockup control valve 85 is operated to communicate the passage 79 with the passage 86 and the passage 87 with the passage 89 as shown in FIG. 2. Reversely, when the solenoid is energized, an actuating pressure Pc2 is applied to the lockup control valve 85 through a passage 76, thereby communicating the passage 58 with the passage 87, the passage 79 with passage 89, and draining the passage 86.

The actuating pressure Pc2 is further applied to the first relief valve 59 through a passage 76a having orifices 77 and a check valve 78 disposed in parallel to the orifices 77. More particularly, when the lockup clutch 15 is engaged by the actuation of the solenoid operated valve 75, the actuating pressure Pc2 is applied to the first relieve valve 59 to relief the lubricating oil, thereby to decrease the lubricating pressure PL in accordance with the transmitted torque. When the valve 75 is turned off to release the clutch 15, the oil in the valve 59 is quickly drained through the check valve 78 so that the lubricating pressure PL is quickly increased to correspond to an increase in the torque. Reversely, at the engagement of the clutch 15, the actuating pressure Pc2 is gradually applied to the relief valve 59 through the orifice 77, thereby maintaining the lubricating pressure PL high for a time to prevent the belt and the clutch from slipping in a transient state where the transmitting torque changes.

The passage 58 is further communicated with the safety lock valve 60 which is connected to the selector valve 63 through passages 61 and 62. The selector valve 63 is provided for selectively connecting the passages 61, 62 in accordance with operations of a selector lever for selecting operational ranges such as a parking range (P), reverse range (R), neutral range (N), and drive range (D). The selector valve 63 is communicated with the forward clutch 17 through a passage 64 and with the reverse brake 18 through a passage 65. The passage 64 is communicated with an accumulator 72 through a passage 71 having an orifice 69 and a check valve 70 which are disposed in parallel Hence the oil is adapted to be gradually supplied to the forward clutch 17 so as to gradually engage the clutch 17. Similarly, the passage 65 is communicated with an accumulator 74 through a passage 73 having an orifice 69 and check valve 70 disposed in parallel.

The safety lock valve 60 has a solenoid operated on-off valve 67 which is supplied with the lubricating pressure PL of the first relief valve 59 through passage 58. The lubricating pressure PL is applied to an end chamber of the valve 60 through the passage 66 and to an opposite chamber through the passage 58. When the solenoid valve 67 is turned off, the safety lock valve 60 is operated to communicate the passage 61 with the passage 58, and the passage 62 with the passage 51 as shown in FIG. 2. Thus the lubricating pressure PL is applied to the selector valve 63 through the passages 58 and 61. When the belt 26 of the transmission slips, or when a selector lever is misshifted during driving, the control unit 100 applies a signal to the solenoid operated valve 67 to apply an actuating pressure Pc1 to the safety lockup valve 60. Accordingly, the valve 60 is operated to forcibly drain the oil in the forward clutch 17 or the reverse brake 18 to disengage the transmission.

The operations of the system will be described hereinafter.

When the engine 1 starts, the oil pump device 41 is driven by the oil pump driving shaft 35 and the converter cover 11 to supply pressurized oil to the secondary pressure control valve 52. When the vehicle stops, the primary pressure Pp reaches the lowest pressure. The secondary pressure Ps is applied only to the cylinder 24 of the secondary pulley 25 so that the drive belt 26 engages with the secondary pulley 25 at a maximum running diameter to provide the largest transmission ratio (low speed stage).

During the low engine speed range where a large quantity of the oil is used, the control unit 100 applies a signal to actuate the solenoid operated on-off valve 46, thereby applying the actuating pressure Pc3, which is the same as the lubricating pressure PL, to the changeover valve 44. The changeover valve 44 is operated to communicate the passage 37 of the auxiliary pump 43 with the passage 51. Thus, the changeover valve 44 is operated to drive the pump device 41 in the twin mode to increase the pump capacity.

The lubricating pressure PL of the oil adjusted by the first relief valve 59 is supplied to the solenoid operated valves 46, 67 and 75. From the lubricating pressure PL, the second relief valve 80 regulates the second lubricating pressure PL′ which is applied to the nozzle 83 to lubricate the belt 26. The lubricating pressure PL and the secondary pressure Ps are supplied to the selector valve 63 through the safety lock valve 60. The lubricating pressure PL is also supplied to the lockup control valve 85. At starting of the vehicle, the solenoid operated valve 75 is inoperative so that the passage 79 is communicated with the passage 86. Thus, the pressure of the oil is applied to the torque converter 12 through the release side oil chamber 15a and drained to the oil reservoir 50 through the passage 87, 89 and the oil cooler 90. Since all of the oil from the torque converter 12 is applied to the oil cooler 90, the oil heated in the torque converter 12 is efficiently cooled. The lockup clutch 15 is disengaged and the torque converter 12 is in operating state. In a normal state, the safety lock valve 60 operates to communicate the passage 51 with the passage 62 and the passage 58 with the passage 61 by the solenoid operated valve 67, so that the selector valve 63 is supplied with the lubricating pressure PL and the secondary pressure Ps.

When the lockup clutch 15 is thus disengaged, the lubricating pressure PL is adjusted to a high pressure by the first relief valve 59. Thus the forward clutch 17 is securely engaged without slipping when a large torque is transmitted during the operation of the torque converter 12.

When the D range is selected, the actuating pressure is gradually applied to the forward clutch 17 through the accumulator 72 to lock the planetary gear 16, so that the input shaft 13 is smoothly engaged with the main shaft 20. Thus, the torque converter 12 operates to transmit the power of the engine 1 to the automatic transmission 5. The power of the engine 1 is transmitted to the output shaft 23 at the largest transmission ratio by the drive belt 26 and the pulleys 22, 25 and further transmitted to the axles 32 of the driving wheels 33 through the final reduction device 6. Thus, the vehicle is started.

After starting of the vehicle, the transmission control is started.

The secondary pressure Ps is applied to the primary pressure control valve 56 which is operated to supply the oil to or drain the oil from the cylinder 21 to change the primary pressure Pp for controlling the transmission.

At the same time, the secondary pressure Ps which is controlled in accordance with the transmission ratio, torque from the engine, and torque multiplied by the torque converter 12, is applied to the cylinder 24 to hold the belt 26 at a necessary minimum force. Thus, the power is transmitted through the transmission without slipping of the belt 26.

After starting of the vehicle, when the torque converter 12 reaches a condition for the lockup range, and when the solenoid operated valve 75 is turned on, the actuating pressure Pc2 is applied to the lockup control valve 85. The oil in the release side chamber 15a is drained through the passage 86, and the oil is applied through the passages 84 and 87 to the apply side chamber 15b. The lockup clutch 15 is pushed by the oil pressure in the apply side chamber 15b to lock the crankshaft 2 and the lockup clutch 15, which means locking of the torque converter 12. Therefore, the engine power can be transmitted to the input shaft 13 through the lockup clutch 15.

The actuating pressure Pc2 is gradually applied to the first relief valve 59 through the passage 76a and the orifices 77 so that the high lubricating pressure PL is maintained for a while. Thereafter, the first relief valve 59 is operated to decrease the lubricating pressure PL in accordance with the transmitted torque.

When the lockup clutch 15 engaged, the oil is fills in the apply side chamber 15b so that a large quantity of the oil flows from the first relief valve 59 to the passage 79. Since the lockup control valve 85 is operated to communicate the passage 79 with the passage 89, the oil, the pressure of which is regulated by the second relief valve 80, is drained through the oil cooler 90. Thus, a sufficient quantity of oil is applied to the oil cooler 90 to effectively cool the oil. In addition, the oil drained from the second relief valve 80 is effectively returned to the oil pump device 41.

In a stable state in a high engine speed range, the control unit 100 determines that the quantity of oil discharged from the pump device 41 is larger than the oil used, thereby turning off the solenoid operated valve 46. Accordingly, the changeover valve 44 is operated to communicate the passage 37 with the inlet port 43a of the auxiliary pump 43. The auxiliary pump 43 idles so that the oil pump device 41 is driven in the single mode. As a result, the pump capacity is decreased. Hence the pump 43 can be driven to constantly provide an adequate quantity of oil without increasing the load on the pump 43.

When the R range is selected, the selector valve 63 is operated to provide a high secondary pressure Ps to the reverse brake 18 through the passages 62 and 65 to rotate the carrier 16b of the planetary gear device 16 in reverse. The accumulator 74 operates to gradually apply the pressure so that the reverse brake 18 is smoothly engaged without a shock. The lockup clutch 15 is released at the R range.

When the selector lever is erroneously operated to select the R range while the vehicle is driven, the solenoid operated valve 67 is turned on to operate the safety lock valve 60. The passages 61 and 62 are drained to position the selector valve 63 in a neutral position. Thus accidents are prevented.

The solenoid operated valve 46 may break down during driving. In such a case, the valve 46 is inevitably closed, thereby stopping the supply of the actuating pressure Pc3 to the changeover valve 44. As a result, the oil pump device 41 is operated in the single mode. Thus, even when the solenoid operated valve 46 breaks down in a high engine speed range, the operational mode of the pump device 41 is kept in single mode so that the vehicle is prevented from rapidly decelerating. Consequently, safe driving is insured.

If the vehicle brake pedal is suddenly depressed while the oil pump device 41 is operated in the twin mode, the engine speed is rapidly decreased. The discharge quantity of the pump is accordingly reduced so that the lubricating pressure PL is decreased. However, the communication between the passage 37 and the passage 51 is maintained by the biasing of the spool by the spring 44b, and the pump capacity is prevented from decreasing.

Thus, the two lubricating pressures PL and PL' are appropriately used in the hydraulic circuit of the present invention. For example, when starting the vehicle where the lockup clutch 15 is disengaged, although the secondary pressure Ps and the first lubricating pressure PL are high, the belt 26 is lubricated at a low pressure PL' through the passage 79a, the orifice 82 and the nozzle 83.

Furthermore, the changeover valve 44 for changing the operational mode of the oil pump device 41 is prevented from being affected by the operation of the lockup clutch 15. More particularly, in a stable state in the high engine speed range, the solenoid operated valve 46 is turned off, thereby operating the oil pump device 41 in the single mode. When the engine speed decreases, the solenoid operated valve 75 is turned off to release the lockup clutch 15. Since a large quantity of the oil is applied to the release side chamber 15a of the clutch 15, the solenoid operated valve 46 is turned on to drive the pump device 41 in the twin mode in a conventional hydraulic circuit. As a result, the discharge of the pump device is increased so that the solenoid operated valve 46 is turned off to return the mode of the pump device 41 to the single mode. Thus, hunting of the pump capacity occurs. To the contrary, in the hydraulic circuit of the present invention, the second lubricating pressure PL' is applied to the release side chamber 15a through the passage 79. Since the first lubricating pressure PL does not change, the pump device 41 is continuously operated in the single mode.

Figure 3:
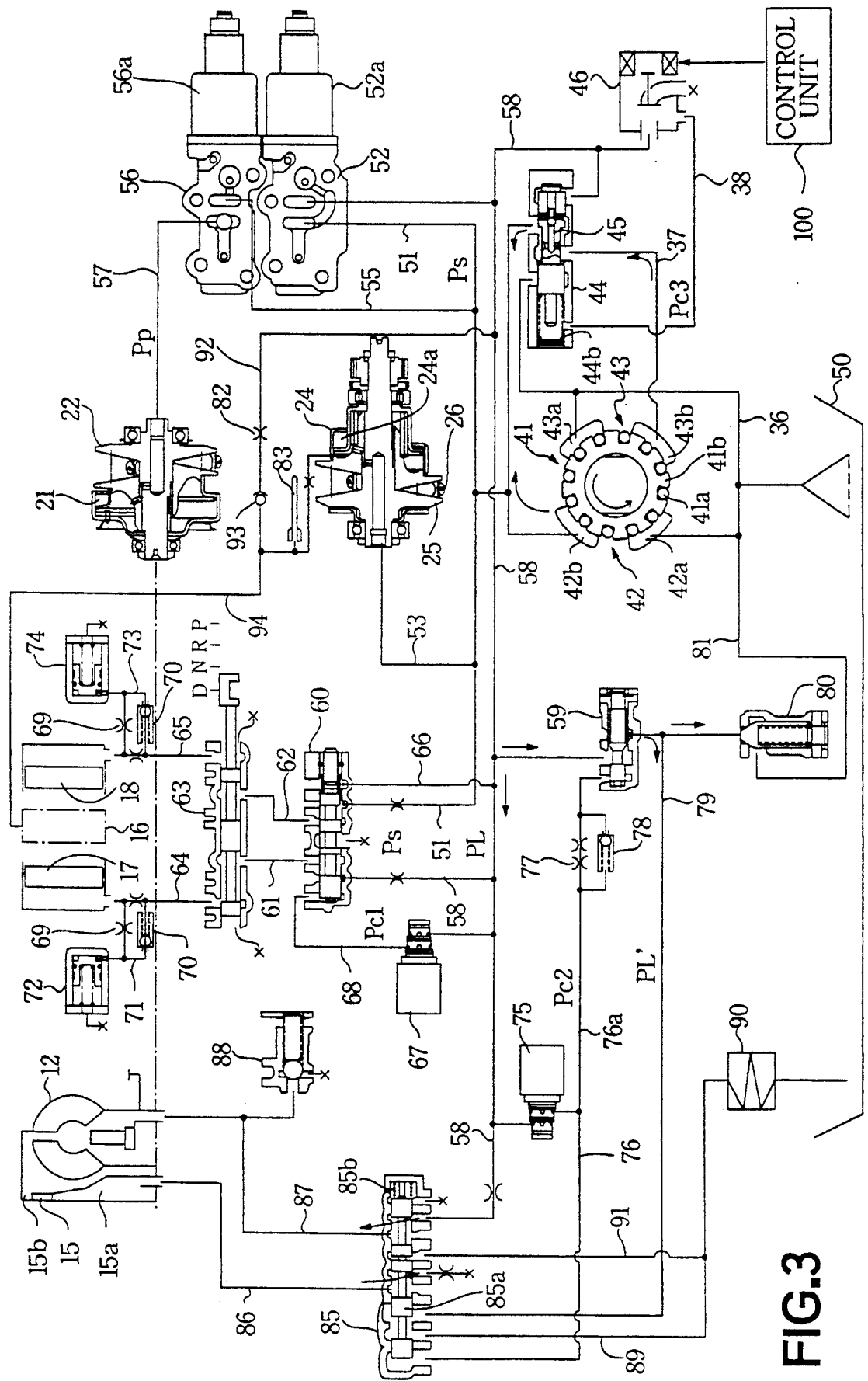
FIG. 3 shows another embodiment of the hydraulic control circuit according to the present invention.

Referring to FIG. 3 showing a hydraulic circuit of the second embodiment of the present invention, an oil passage 92 having a check valve 93 and an orifice 82 connected to the nozzle 83 is communicated with the passage 58. The passage 92 is further communicated with a balancing chamber 24a of the secondary cylinder 24. A passage 94 branching from the passage 92 is communicated with lubricating parts in the planetary gear device 16 of the selector device 4. Thus, the belt 26 of the transmission 5 and other lubricating parts are lubricated at the high first lubricating pressure PL instead of the low second lubricating pressure PL'. The lockup control valve 85 is constructed to communicate the passage 87 from the torque converter 12 with the oil cooler 90 through a passage 91.

Figure 2:
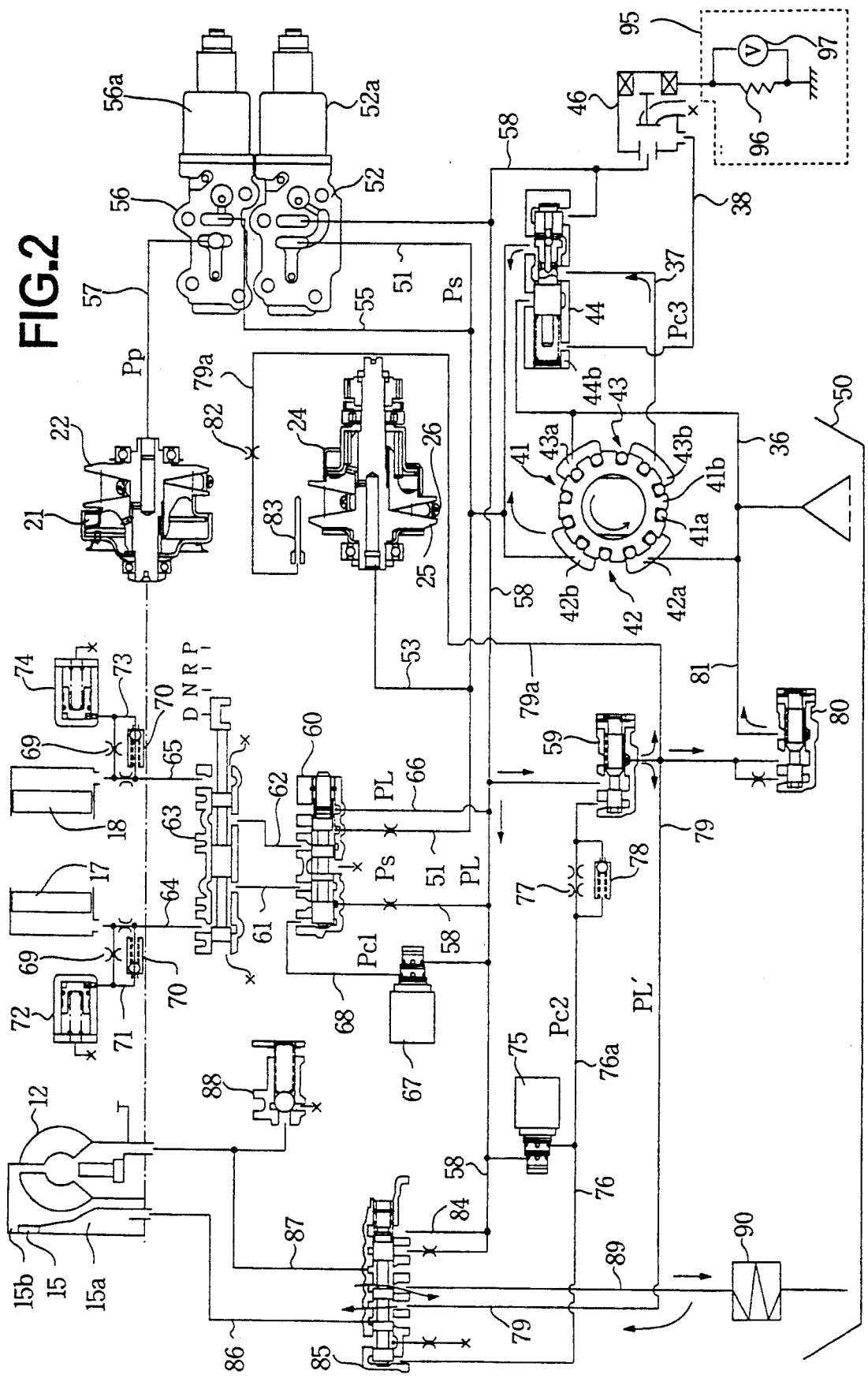
FIG. 2 shows a hydraulic control circuit of the continuously variable transmission of the present invention.
Figure 4:
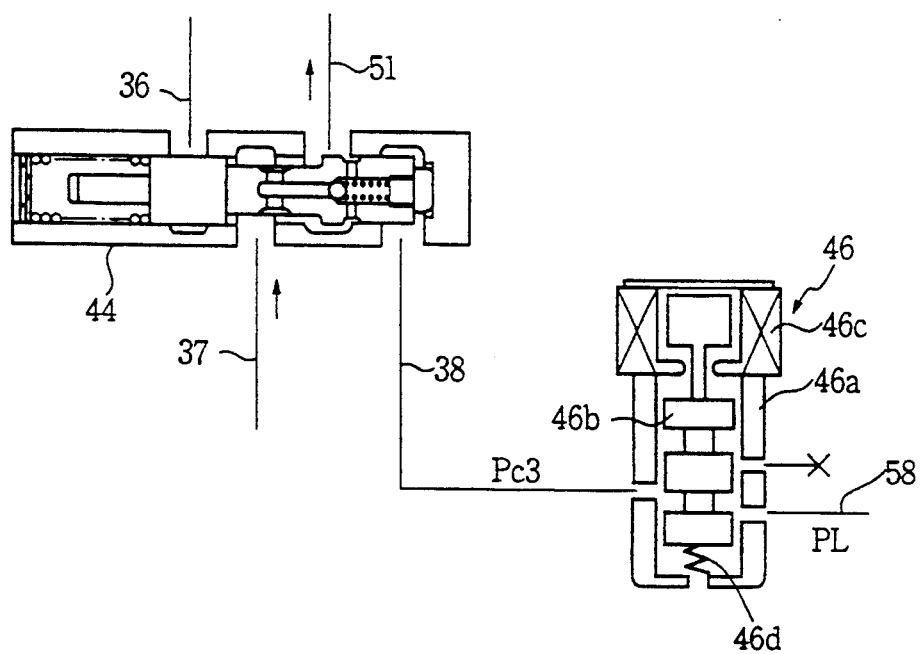
FIG. 4 shows a modification of a solenoid operated valve and a changeover valve for controlling a pump device provided in the hydraulic control circuit of the present invention.

The changeover valve 44 and the solenoid operated valve 46 shown in FIGS. 2 and 3 may be modified as shown in FIG. 4. The valve 46 is a spool valve having a valve body 46a in which a spool 46b is inserted. A solenoid 46c is disposed at an end of the spool 46b and a spring 46d is disposed at the other end between the body 46a and the spool 46b. When the solenoid 46c is energized, the lubricating pressure PL supplied through the passage 58 is applied to the changeover valve 44 through the passage 38 as the actuating pressure Pc3. The valve 44 is operated to communicate the passage 37 with the passage 36, thereby driving the pump device 41 in the single mode.

The hydraulic control system of the present invention may be provided with a system for correcting the transmission ratio when the solenoid operated valve 46 fails. As indicated by a dotted line in FIG. 2, the solenoid of the solenoid operated valve 46 is connected to a signal circuit 95 having a resistor 96 and a voltmeter 97 disposed in parallel to the resistor 96. The voltmeter 97 detects the failure of the solenoid.

Figure 5:
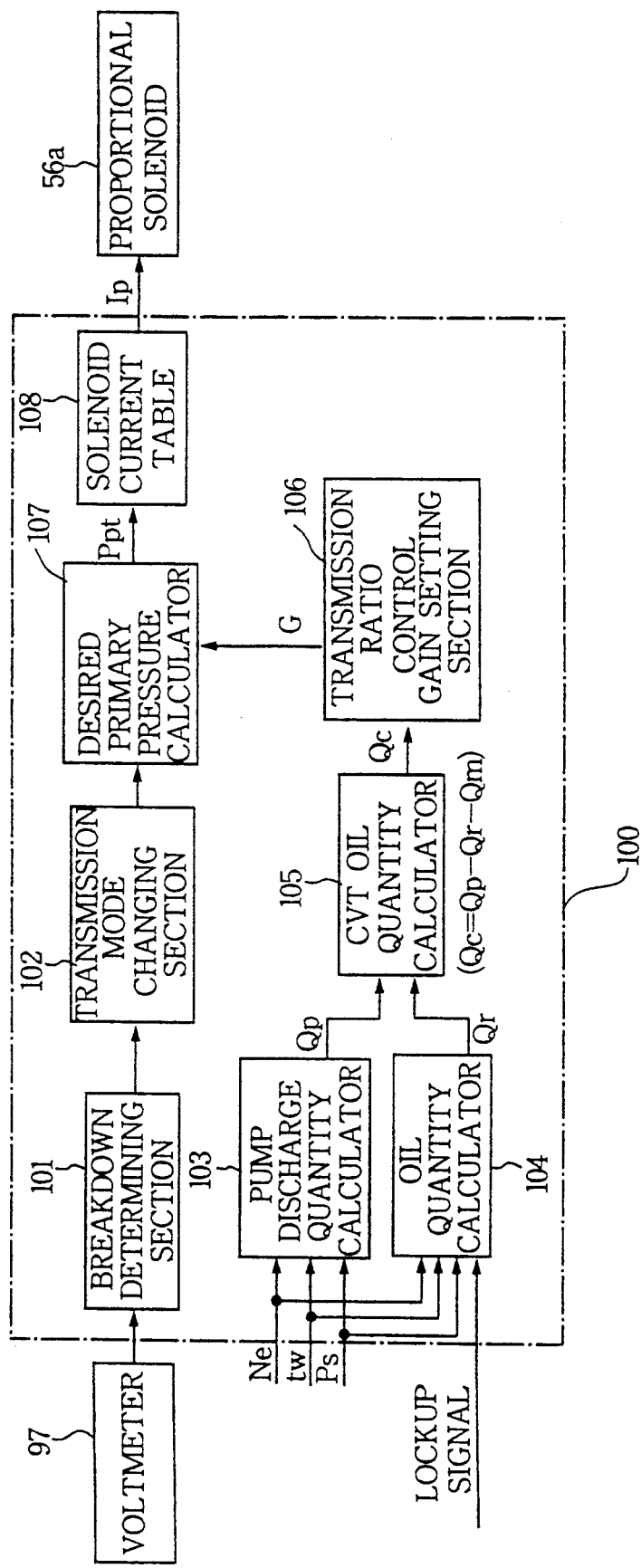
FIG. 5 shows a block diagram of a system for controlling the transmission ratio at failure of the solenoid operated valve for the pump device.

Referring to FIG. 5, a fail-safe control system provided in the control unit 100 comprises a breakdown determining section 101 to which the output signal of the voltmeter 97 is fed. When the solenoid operated valve 46 breaks down, a breakdown signal is applied to a transmission mode changing section 102 to change the transmitting mode to a breakdown mode.

The control unit 100 further has a pump discharge quantity calculator 103 to which an engine speed Ne, a secondary pressure Ps and an oil temperature tw are applied to calculate a pump discharge quantity Qp. An oil quantity calculator 104 calculates a quantity Qr of the oil used in parts of the hydraulic circuit besides the continuously variable transmission 5 in accordance with the engine speed Ne, the secondary pressure Ps, the oil temperature tw and a lockup signal from the lockup clutch 15. The quantities Qp and Qr are applied to a continuously variable transmission (CVT) oil quantity calculator 105 where a quantity Qc used in the transmission 5 is calculated as follows $$Qc = Qp - Qr - Qm$$

where Qm is a margin. The CVT oil quantity Qc is fed to a transmission ratio control gain setting section 106. The transmission ratio control gain setting section 106 determines a control gain G corresponding to the oil quantity Qc in dependency on the transmission ratio i and transmission ratio changing/rate di/dt. The gain G is an increasing function of the oil quantity Qc and the transmission ratio i, and an decreasing function of the transmission ratio changing rate di/dt. The transmission ratio control gain G has a small value since the gain corresponds to a value of half of the CVT oil quantity Qc. The transmission ratio control gain G and the output signal of the transmission mode changing section 102 are fed to a desired primary pressure calculator 107 where a desired primary pressure Ppt is calculated as follows $$Ppt = Ppis + G(kp + kd + ki) \times Pst$$

where Ppis is a necessary primary pressure necessary to provide a desired transmission ratio, Pst is a necessary secondary pressure necessary to keep the actual transmission ratio, and kp, kd and ki are terms relative to a proportion, a differential, and an integral of the difference in the primary pulley speed Np, respectively. The desired primary pressure Ppt is fed to a solenoid current table 108 to derive a solenoid current Ip corresponding to the desired primary pressure Ppt. The current Ip is applied to the proportional solenoid 56a of the primary pressure control valve 56.

In operation, when the signal circuit 95 is disconnected, the solenoid operated valve 46 is turned off. Accordingly, the auxiliary pump 43 idles so that the pump device 41 is in the single mode. At the same time, the breakdown determining section 101 of the control unit 100 determines the breakdown of the solenoid operated valve 46 in accordance with the signal from the voltmeter 97. As a result, the transmission mode is changed to the breakdown mode at the transmission mode changing section 102.

If the lockup clutch 15 is engaged at that time, the oil quantity Qr is calculated by the oil quantity calculator 104. Since the pump capacity is decreased, the pump discharge quantity Qp obtained at the pump discharge quantity calculator 103 is decreased. Consequently, the CVT oil quantity Qc which is obtained by the CVT oil quantity calculator 105 is also decreased. A small transmission ratio control gain G is set at the transmission ratio control gain setting section 106 in accordance with the small CVT oil quantity Qc. The desired primary pressure calculator 107 calculates the desired primary pressure Ppt in accordance with the transmission ratio control gain G, the primary pulley speed Np, and the terms kp, kd and ki relative to the proportion, differential and integral, respectively of the difference of the primary pulley speed Np. Namely, a relatively low primary pressure Pp is obtained. Thus, the transmission ratio is controlled in a large transmission ratio range so that minimum driving ability is insured although the pump capacity is small.

From the foregoing it will be understood that the present invention provides a hydraulic control system for a continuously variable transmission where the hydraulic control circuit comprises a high lubricating pressure circuit and a low lubricating pressure circuit to provide high and low lubricating pressures, respectively. The high pressure circuit is communicated with the oil cooler when releasing the lockup clutch, and the low pressure circuit is communicated when the clutch engages. Thus a sufficient quantity of the oil is supplied to the oil cooler regardless of the operating conditions of the lockup clutch. Since the oil cooler does not branch off from the circuit, the oil is supplied smoothly thereto, thereby increasing the cooling efficiency of the oil cooler. Moreover, the low lubricating pressure is employed at various parts of the hydraulic system without affecting the overall balance of the oil. As a result, the controllability and the reliability of the hydraulic system are improved.

While the presently preferred embodiments of the present invention have been shown and described, it is to be understood that these embodiments are illustrative and that various changes and modifications may be made without departing from the scope of the invention as set forth in the appended claims.

What is claimed is:

1. A hydraulic control system for a continuously variable transmission mounted on a motor vehicle having an engine and a torque converter connected to said engine via a lockup clutch for transmitting torque from said engine to a driving wheel of the vehicle via said transmission, the latter comprising a primary cylinder provided in a primary pulley of said continuously variable transmission for applying a primary oil pressure, a secondary cylinder provided in a secondary pulley for applying a secondary oil pressure, and an endless belt on said primary and secondary pulleys for transmitting said torque, the hydraulic control system comprising a hydraulic circuit including a pump for supplying oil to said continuously variable transmission and said lockup clutch for their actuation and to said belt for lubricating said belt by injecting said oil through a nozzle, a lockup clutch control valve connected to said lockup clutch, and an oil cooler interposed between said lockup clutch control valve and an oil reservoir, the hydraulic control system further comprising:
 a first lubricating circuit connected between said lockup clutch control valve and said hydraulic circuit for controlling said lockup clutch;
 a second lubricating circuit provided between said lockup clutch control valve and said nozzle for lubricating said belt;
 means comprising a first relief valve interposed between said first and second lubricating circuits for controlling said secondary oil pressure at an optimum pressure in order to actuate said secondary pulley and said lockup clutch without slipping even when said torque fluctuates and for draining said oil to said reservoir via said second lubricating circuit and said lockup clutch control valve by flow of said oil through said oil cooler so as to efficiently cool said oil; and
 means comprising a second relief valve connected to said second lubricating circuit and said first relief valve for regulating oil pressure in said second lubricating circuit to a pressure lower than said optimum pressure and for supplying sufficient oil to said nozzle so as to sufficiently lubricate said belt.

2. A hydraulic control system for a continuously variable transmission mounted on a motor vehicle having an engine and a torque converter connected to said engine via a lockup clutch for transmitting torque from said engine to a driving wheel of the vehicle via said transmission, the latter comprising a primary pulley, a secondary pulley and an endless belt on said pulleys, a primary cylinder provided in said primary pulley for applying a primary oil pressure to change running diameter of said belt on said primary pulley, and a secondary cylinder provided in said secondary pulley for applying a secondary oil pressure, the hydraulic control system comprising a hydraulic circuit including a pump for supplying oil to said continuously variable transmission and said lockup clutch for their actuation and to said belt for lubricating said belt by injecting said oil through a nozzle, a lockup clutch control valve connected to said lockup clutch, and an oil cooler interposed between said lockup clutch control valve and an oil reservoir, the hydraulic control system further comprising:
 a first lubricating circuit connected between said lockup clutch control valve and said hydraulic circuit for controlling said lockup clutch;
 a second lubricating circuit provided between said lockup clutch control valve and said first lubricating circuit;
 means comprising a first relief valve interposed between said first and second lubricating circuits for controlling said secondary oil pressure at an optimum pressure in order to actuate said secondary pulley and said lockup clutch without slipping even when said torque fluctuates and for draining said oil to said reservoir via said second lubricating circuit and said lockup clutch control valve by flow of said oil through said oil cooler so as to efficiently cool said oil; and
 means comprising a second relief valve connected to said second lubricating circuit and said first relief valve for regulating oil pressure in said second lubricating circuit to a pressure lower than said optimum pressure; and said first lubricating circuit communicating with said nozzle for supplying sufficient oil to said nozzle so as to sufficiently lubricate said belt.

3. A hydraulic control system according to claim 2, wherein
 said first relief valve provides said optimum pressure in said first lubricating circuit communicating with said nozzle.

* * * * *